UNITED STATES PATENT OFFICE.

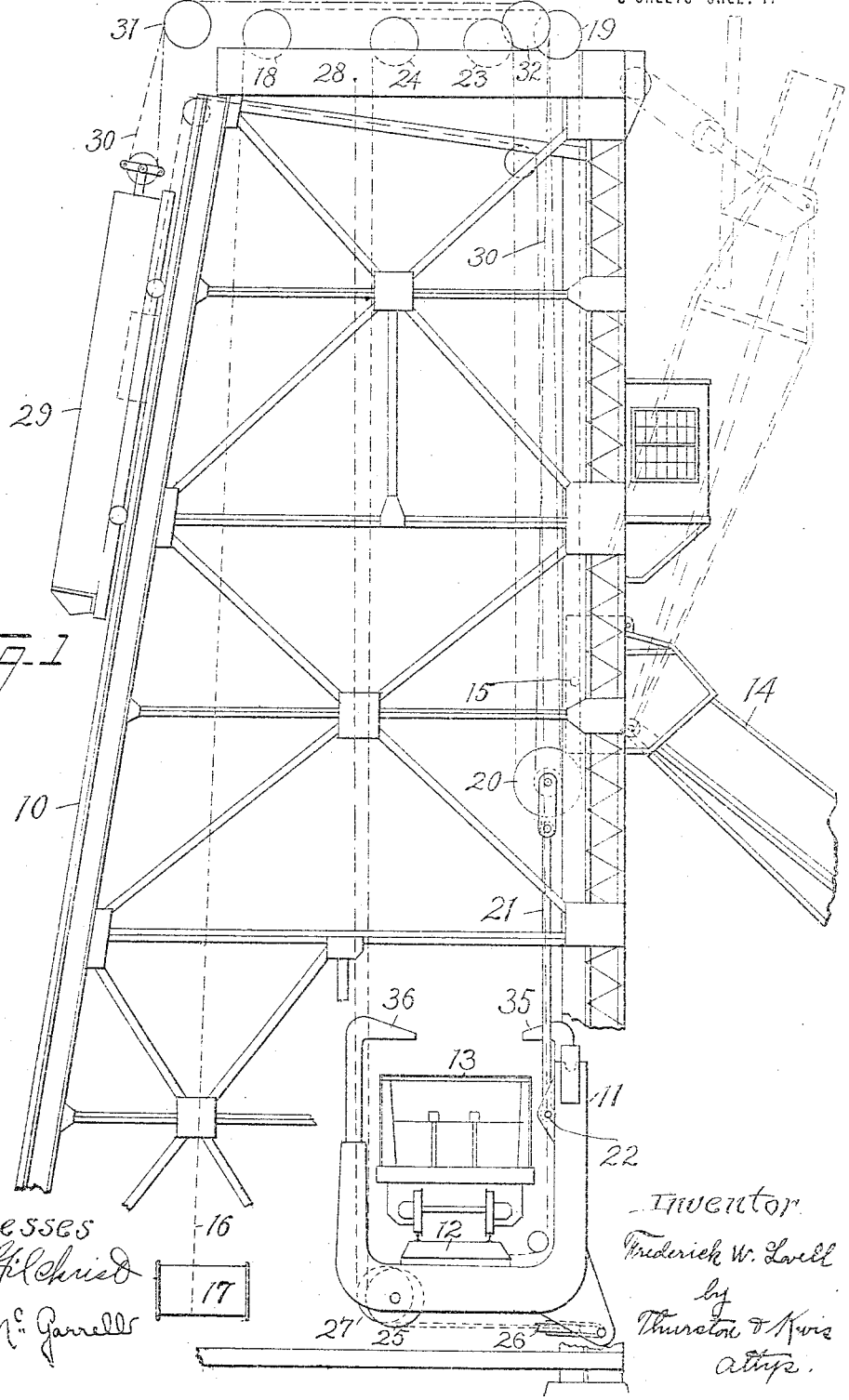

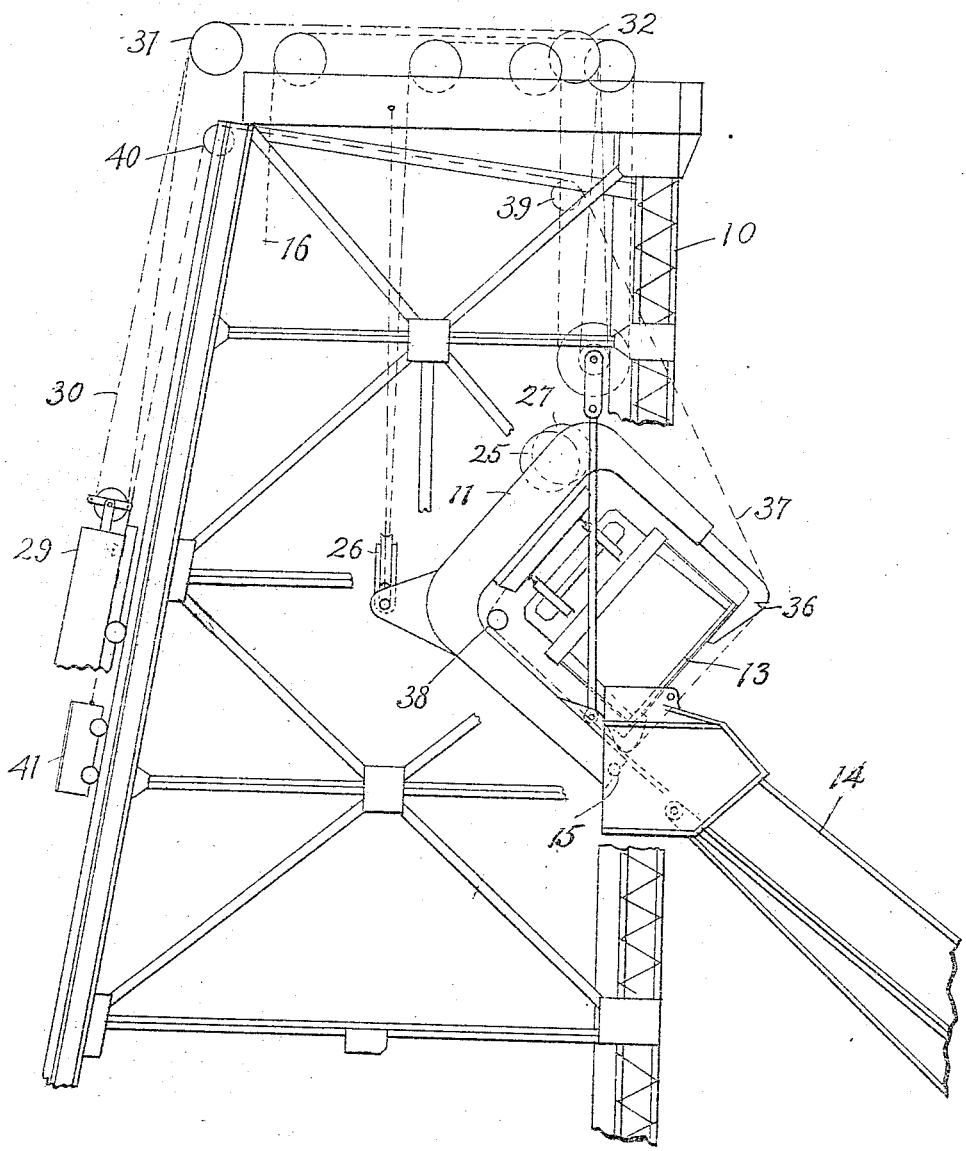

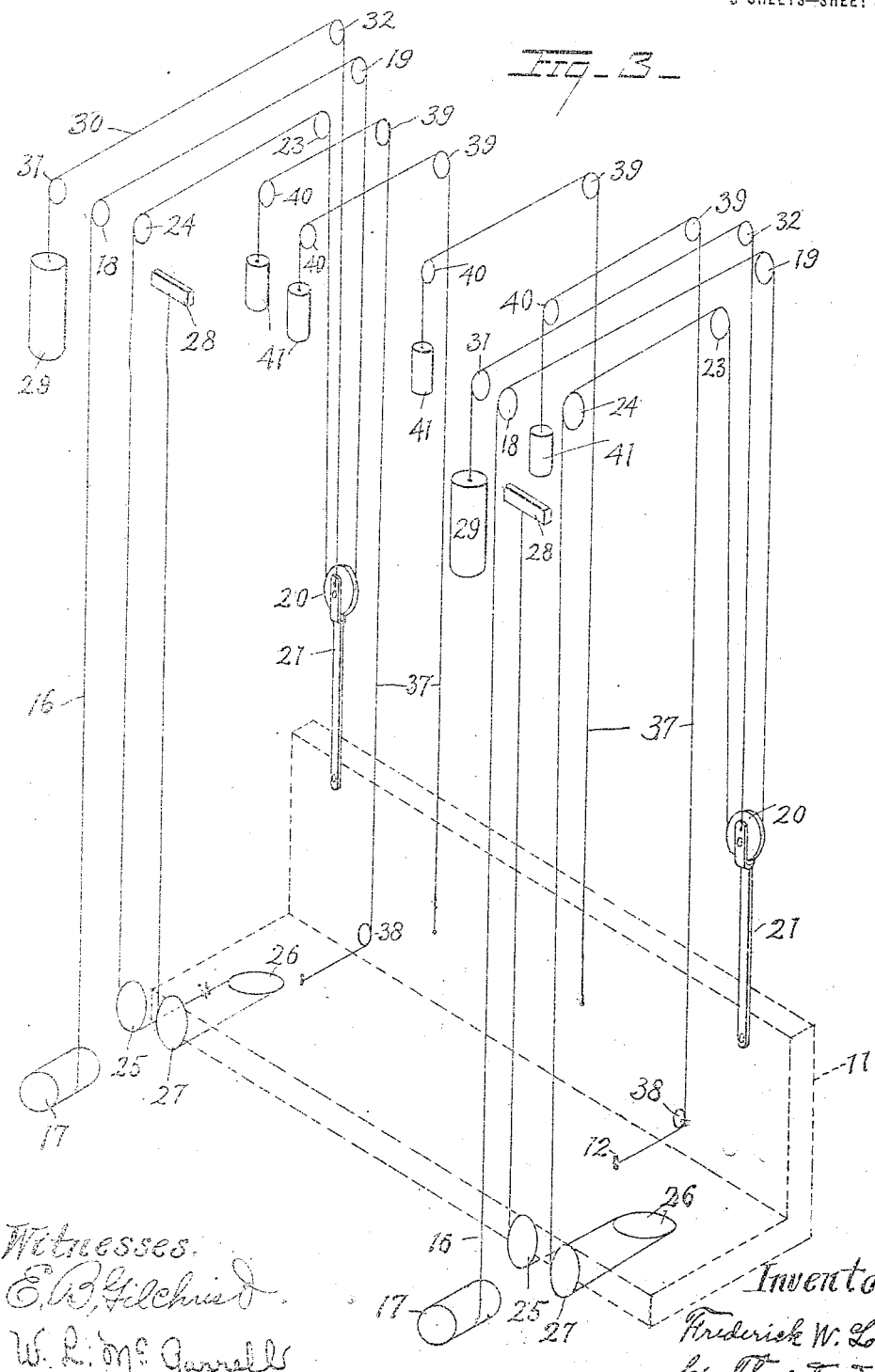

FREDERICK W. LOVELL, OF CLEVELAND, OHIO, ASSIGNOR TO THE McMYLER INTERSTATE COMPANY, OF CLEVELAND, OHIO, A CORPORATION OF OHIO.

CAR-DUMPER.

1,145,607.

Specification of Letters Patent.

Patented July 13, 1915.

Application filed November 25, 1912. Serial No. 733,238.

*To all whom it may concern:*

Be it known that I, FREDERICK W. LOVELL, a citizen of the United States, residing at Cleveland, in the county of Cuyahoga and State of Ohio, have invented a certain new and useful Improvement in Car-Dumpers, of which the following is a full, clear, and exact description.

This invention relates to car dumpers of the type comprising a tower and a cradle which is adapted to receive a car and to be elevated to a suitable height in the tower and then tilted by turning the cradle and car about suitable pivots or bearings at the front of the tower.

One of the main objects of the present invention is to provide an arrangement of sheaves and reeving of hoisting and tilting cables such that there is less pull or load transmitted through the individual cables, allowing material reduction in the number of cables, and so that the cradle and car while being elevated are more evenly balanced in the cables, thus relieving the cables of the so-called peak load, which is ordinarily encountered at the start of the tilting movement of the cradle.

A further object is to provide means for effectively counterbalancing the car and cradle without introducing serious complications which heretofore have been presented in attempts to counterbalance the cradle and car, in addition to the small counterbalancing effect produced by the counterbalanced cables which are utilized to hold the car onto the cradle while the car and cradle are tilted out of normal position.

Still further, the invention aims to provide clamping means for holding the car onto the cradle while the cradle is tilted, which are less liable to injure the sides of the car than the devices and arrangements employed heretofore.

The above and other objects are accomplished by my invention which will be here briefly summarized as consisting in certain novel combinations and arrangements of parts which will be described in the specification and set forth in the appended claims.

In the drawings, Figure 1 is a side elevation of a car dumper embodying my invention, parts being omitted and other parts being shown in simplified or conventional form; Fig. 2 is a similar view of the upper portion of the unloader with the cradle and car tilted to position for discharging the contents of the car into the receiving chute; Fig. 3 is a diagrammatic view showing particularly the reeving of the hoisting and different counterweighted cables.

The car dumper includes a tower 10 which except for minor details may be of the usual construction, and a cradle 11 provided with a platform 12 upon which a loaded car 13 may be placed. The car and cradle are adapted to be elevated to a suitable height in the tower and then tilted so as to discharge the contents of the car into a chute 14 which may be of the usual construction, the car and cradle being tilted about suitable pins or studs 15, which are engaged by the upper notched or crotched portions of the cradle in the customary manner.

The cradle and car are elevated and tilted through the medium of cables 16, each extending upwardly from a winding drum 17 about a sheave 18 at the top of the tower, thence forwardly about a sheave 19, thence downwardly about a sheave 20 supported in the upper bifurcated end of an arm 21 which extends a suitable distance above the cradle and at its lower end is pivotally connected, as shown at 22 to the front end of the cradle rearwardly or inwardly of and below the notched or forked part of the cradle which encounters the pivotal pin or stud about which the cradle is adapted to be tilted. From the sheave 20, the cable extends upwardly to the top of the tower and passes about a sheave 23, thence rearwardly about a sheave 24, thence downwardly about a sheave 25, at the lower rear side of the cradle, thence forwardly about a substantially horizontal sheave 26 having a swiveled or pivotal connection with a projection at the lower front portion of the cradle, thence rearwardly about a sheave 27, at the lower rear side of the cradle, and thence upwardly to the top of the tower, where it is dead-ended as shown at 28. The two sheaves 25 and 27 are in fact in alinement and will be supported upon the same pin, but for the sake of clearness are shown somewhat displaced from alinement. This described arrangement of sheaves and cable reeving is the same at both ends of the tower. With this cable reeving, the cradle and car are elevated by cables connected to both the front and rear sides of the cradle, with the result that the parts elevated are more evenly balanced in the cables than is usually the case in practical constructions of car dumpers. This in itself reduces largely the peak load met at the beginning of the tilting movement of the cradle and does away with any necessity for stopping or even slowing down the movement of the cradle just before the cradle encounters the pivotal members about which it is tilted, as has been frequently necessary heretofore. Furthermore, the above described arrangement provides a double reeving of cables between the top of the tower and the rear side of the cradle, and this reduces the load on the individual cables and permits the use of a smaller number of cables than is generally required. Still further, the cables connected to the front part of the cradle assist in tilting the cradle and car because such front cables have operative connections with the front part of the cradle below and rearwardly or inwardly of the notched parts of the cradle which engage the members about which the cradle is tilted. A further advantage of this particular reeving lies in the fact that the cables extend from the drum or drums to the sheaves connected to the forward side of the cradle before passing about the sheaves connected to the rear side of the cradle. Consequently, by reason of the fact that part of the load which is transmitted by the cables beyond the sheaves connected to the front side of the cradle, is utilized in overcoming the friction of the sheaves connected to the rear part of the cradle, there is a slightly greater elevating pull at the front side of the cradle than at the rear side. This lessens the liability of premature tilting of the car and cradle.

The cradle and car are counterweighted by counterweights 29, each connected by a double cable 30 which passes upwardly to the top of the tower about a sheave 31, thence forwardly about a sheave 32, and thence downwardly to the front end of the cradle. It is immaterial whether or not the cables 20 are connected directly to the cradle, and in this case each cable is looped about a pivotal stud supporting one of the sheaves 20, which as previously stated, is supported at the upper end of one of the arms 21 which in turn are connected to the front ends of the cradle. With this arrangement, not only is the cradle and car counterbalanced, but the counterweights assist in tilting the car and cradle by reason of the leverage between the pivotal axis of the cradle and the points of attachment of the arms 21 with the cradle. By reference to Fig. 2, it will be seen that the arms 21, which are provided at the ends of the cradle so as to be beyond the ends of the car, may swing relative to the cradle as the latter is tilted without in any way interfering with the movement of the cradle and without being deflected by the body of the car as it is tilted. Furthermore, by referring to this same figure, it will be seen how the sheave 26 which is pivotally supported at the lower front end of the cradle swings relative to the cradle as the latter is tilted.

I retain the car on the cradle while the latter is tilted from normal upright position by two series of clamps including front clamps 35 which are adapted to engage the forward side of the car and rear clamps 36, together with counterweighted cables 37, see particularly Fig. 2, which at the lower ends are connected to the platform 12, or to the front of the cradle, and pass upwardly about sheaves 38 at the lower front side of the cradle, to the upper portion of the tower, thence about sheaves 39, thence rearwardly about sheaves 40, and thence downwardly to counterweights 41 which are smaller than the main counterweights 29. The clamps 35 and 36 are slidably supported in the front and rear sides of the cradle so that when the car and cradle are in their lowermost positions, the clamping portions of the clamps are elevated above the car, and when the car and cradle are elevated, the clamps drop down so as to engage the top edges of the sides of the car. The front and rear clamps are arranged in pairs in line with each of the counterweighted cables 37, so that as the car tilts, the sets of front and rear clamps are engaged by the cables 37 and are thereby held in engagement with the sides of the car. The clamps are sufficiently stiff that no inward or side pressure is transmitted onto the sides of the car, but the pressure is transmitted to the car body in substantially the planes of the sides thereof, so that there will be very little or no tendency for these clamps to crush or bend inwardly the sides of the car, as has been the case with all prior constructions, of which I am aware.

By referring particularly to Fig. 3, the arrangement of various counterweighted cables and counterweights and their functions will be readily understood. It will be seen that I have provided two sets of counterweights, one set including a series of counterweights 41, which are attached to cables arranged and connected directly or indirectly to the forward portion of the cradle, between the ends of the latter and at regularly spaced intervals, these counterweights and cables being provided chiefly for the purpose of holding the car onto the cradle when the cradle and car are tilted; and the second set including the two main counterweights 29 which are attached to cables connected to the ends of the cradle, these counterweights serving to counterbalance the weight of the car and cradle as they are elevated. By considering this Fig. 3 in connection with Fig. 2, it will be readily seen that the cables connected to the main counterweights are connected to the cradle at points beyond the ends of the car on the cradle so as to be out of the path of movement of the car as it is tilted, see Fig. 2, whereas the cables which are connected to the smaller counterweights 41 are attached to the cradle so that they are in the path of movement of the car and cradle as the latter are tilted forwardly and will therefore be deflected or pulled outwardly, as shown in Fig. 2, so as to cause the load of the counterweights 41 to be borne by the clamps which directly hold the car onto the cradle.

Having thus described my invention, what I claim is:

1. In a car dumper, a tower, a cradle adapted to receive a car, and to be elevated to a suitable height in the tower and then tilted or turned forwardly, two sets of counterweights and cables connected thereto and to the cradle, the cables connected to one set of counterweights being connected to the cradle at intervals along the front thereof so as to be in the path of movement of the car as the car and cradle are tilted and the cables connected to the second set of counterweights being connected to the ends of the cradle so as to be out of the path of movement of the car as the latter is tilted.

2. In a car dumper, a tower, a cradle adapted to receive a car and to be elevated and then tilted, means for counterbalancing the car and cradle, and for holding the car onto the cradle when the latter is being tilted comprising a pair of main counterweights, cables connected thereto and extending downwardly from the upper part of the tower and connected to the end portions of the cradle so as to be out of the path of movement of the car as the cradle is tilted, a plurality of auxiliary counterweights smaller than the main counterweights, and cables connected to said auxiliary counterweights and extending downwardly from the upper part of the tower and connected to the cradle at intervals along the front thereof so as to engage the car when the cradle is tilted.

3. In a car dumper, a tower, a cradle adapted to receive a car and to be elevated and then tilted, means for counterbalancing the car and cradle, and for holding the car onto the cradle when the latter is being tilted comprising a pair of main counterweights, and a plurality of auxiliary counterweights arranged at the rear portion of the tower, the auxiliary counterweights being between the main counterweights, a plurality of sheaves at the upper part of the tower, and cables extending from the main counterweights upwardly and forwardly about certain of the sheaves, and thence downwardly and being connected to the cradle near the ends thereof, and cables connected to the auxiliary counterweights and extending upwardly from the latter and forwardly about certain other sheaves, and thence downwardly and being connected to the front of the cradle at spaced points between the points of attachment of the cables connected to the main counterweights.

4. In a car dumper, a tower, a cradle adapted to receive a car and adapted to be elevated and then tilted, an arm projecting upwardly from and pivoted to the front portion of the cradle, a sheave carried by said arm, a hoisting cable passing about said sheave, and a counterweighted cable connected to the upper part of said arm.

5. In a car dumper, a tower, a cradle adapted to receive the car and with the car adapted to be elevated and then tilted, a winding drum, a hoisting and tilting cable, sheaves provided at the upper portion of the tower, a sheave connected to the front part of the cradle, a sheave at the lower rear side of the cradle, said hoisting cable extending upwardly from the drum about a sheave at the upper portion of the tower, thence downwardly about the sheave connected to the front part of the cradle, thence upwardly about a sheave at the upper portion of the tower, thence downwardly about the sheave at the lower rear part of the cradle and thence upwardly toward the top of the tower.

6. In a car dumper, a tower, a cradle adapted to receive a car and adapted with the car to be elevated and tilted, a winding drum, a hoisting and tilting cable, a plurality of sheaves provided at the upper portion of the tower, a sheave having connection with the upper front portion of the cradle, sheaves having connection with the lower rear portion of the cradle, a sheave having connection with the lower front portion of the cradle, said winding cable extending upwardly from the drum about a sheave at the upper portion of the tower, thence downwardly about said sheave having connection with the front portion of the cradle, thence upwardly about a sheave in the upper portion of the tower, thence about a sheave at the lower rear part of the cradle thence about a sheave at the lower front portion of the cradle, thence about a second sheave at the lower rear part of the cradle and thence upwardly to a point in the upper portion of the tower where the cable is dead-ended.

7. In a car dumper, a tower, a cradle adapted to receive a car and adapted with the latter to be elevated and then tilted, a winding drum, a hoisting cable, a plurality of sheaves at the upper portion of the tower, a sheave connected to the upper front portion of the cradle, a pair of sheaves connected to the lower rear portion of the cradle, a substantially horizontal sheave pivotally connected to the lower front part of the cradle, said cable extending upwardly from the drum about a pair of sheaves at the upper portion of the tower, thence downwardly about the said sheave connected to the upper front portion of the cradle, thence upwardly and about a pair of sheaves at the upper portion of the tower, thence downwardly about one of the sheaves at the lower rear part of the cradle, thence about the sheave at the lower front part of the cradle, thence about the second sheave at the lower rear part of the cradle, and thence upwardly to an elevated point in the tower where the cable is dead-ended.

8. In a car dumper, a tower, a cradle adapted to receive a car and adapted with the car to be elevated, and then tilted by causing the upper portion of the cradle to engage and turn about a pivotal member carried by the tower, a winding drum, sheaves at the upper part of the tower, and sheaves connected with the front and rear parts of the cradle, a hoisting and tilting cable connected to the drum and reeved about the sheaves carried by the tower and the sheaves connected to the cradle, the sheave connected to the front part of the cradle having a connection with the cradle below and rearwardly of the point which engages and turns about the said pivotal member whereby that part of the cable connected to the front part of the cradle assist in both elevating and tilting the cradle.

In testimony whereof, I hereunto affix my signature in the presence of two witnesses.

FREDERICK W. LOVELL.

Witnesses:
 N. C. HUBBARD,
 A. F. KWIS.